US009930706B2

United States Patent
Jang et al.

(10) Patent No.: US 9,930,706 B2
(45) Date of Patent: Mar. 27, 2018

(54) DEFINITION OF NEW IDENTIFIER IN WIRELESS ACCESS SYSTEM THAT SUPPORTS DEVICE TO DEVICE COMMUNICATION, AND TRANSMISSION METHOD AND DEVICE USING SAME

(71) Applicant: LG ELECTRONICS INC., Seoul (KR)

(72) Inventors: Jiwoong Jang, Anyang-si (KR); Dongcheol Kim, Anyang-si (KR); Hangyu Cho, Anyang-si (KR); Jinsoo Choi, Anyang-si (KR); Dongguk Lim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 83 days.

(21) Appl. No.: 14/362,066

(22) PCT Filed: Dec. 3, 2012

(86) PCT No.: PCT/KR2012/010361
§ 371 (c)(1),
(2) Date: May 30, 2014

(87) PCT Pub. No.: WO2013/081433
PCT Pub. Date: Jun. 6, 2013

(65) Prior Publication Data
US 2014/0355483 A1 Dec. 4, 2014

Related U.S. Application Data (60) Provisional application No. 61/577,092, filed on Dec. 19, 2011, provisional application No. 61/565,996, filed on Dec. 2, 2011.

(51) Int. Cl.
*H04W 76/02* (2009.01)
*H04W 8/26* (2009.01)
(Continued)

(52) U.S. Cl.
CPC ........ *H04W 76/021* (2013.01); *H04W 4/005* (2013.01); *H04W 8/26* (2013.01);
(Continued)

(58) Field of Classification Search
None
See application file for complete search history.

(56) References Cited

U.S. PATENT DOCUMENTS 8,706,145 B2 * 4/2014 Li .................. H04W 68/00
370/330
2007/0155390 A1 * 7/2007 Kodikara
Patabandi ......... H04W 72/1278
455/450

(Continued)

FOREIGN PATENT DOCUMENTS

KR 10-2010-0038225 A 4/2010
KR 10-2010-0086632 A 8/2010
(Continued)

OTHER PUBLICATIONS

Doppler, Klaus et al., "Device-to-Device Communications; Functional Prospects for LTE-Advanced Networks", In: IEEE International Conference, Jun. 14-18, 2009 See sections, I, III-G; and figure 1.

*Primary Examiner* — Jeffrey M Rutkowski
*Assistant Examiner* — Mehedi Aley
(74) *Attorney, Agent, or Firm* — Dentons US LLP (57) ABSTRACT

The present invention provides definition of an identifier which is required for recognizing information essential for device to device communication, a transmission method thereof, and devices that support the same. The method for supporting device to device (D2D) communication in a wireless access system that supports D2D communication as one embodiment of the present invention comprises the steps of allowing a first D2D device to receive, from a base (Continued)

station, a broadcast message which contains a common D2D identifier (C-D2D-RNTI) for all D2D devices that perform D2D communication; and allowing the first D2D device to receive the transmitted D2D-related information by using the C-D2D-RNTI. In this situation, the wireless access system can support both D2D communication and cellular communication for a normal terminal instead of the D2D device.

12 Claims, 3 Drawing Sheets

(51) Int. Cl.
    *H04W 4/00*     (2018.01)
    *H04W 8/00*     (2009.01)
    *H04W 48/12*     (2009.01)
    *H04W 76/00*     (2018.01)

(52) U.S. Cl.
    CPC ............ *H04W 8/005* (2013.01); *H04W 48/12* (2013.01); *H04W 76/002* (2013.01); *H04W 76/023* (2013.01)

(56) References Cited

U.S. PATENT DOCUMENTS

| | | | | |
|---|---|---|---|---|
| 2008/0165755 A1* | 7/2008 | Marinier | ............. | H04W 28/065 370/342 |
| 2008/0194243 A1* | 8/2008 | Jeong | ................ | H04W 74/0866 455/418 |
| 2011/0268006 A1* | 11/2011 | Koskela | .............. | H04W 72/121 370/312 |
| 2013/0102314 A1* | 4/2013 | Koskela | ............ | H04W 36/0072 455/436 |
| 2013/0273907 A1* | 10/2013 | Vikberg | ................ | H04W 48/02 455/426.1 |

FOREIGN PATENT DOCUMENTS

| | | |
|---|---|---|
| WO | 2010-049801 A1 | 5/2010 |
| WO | 2011-044302 A1 | 4/2011 |
| WO | 2011098128 A1 | 8/2011 |

\* cited by examiner

DEFINITION OF NEW IDENTIFIER IN WIRELESS ACCESS SYSTEM THAT SUPPORTS DEVICE TO DEVICE COMMUNICATION, AND TRANSMISSION METHOD AND DEVICE USING SAME

This Application is a 35 U.S.C. § 371 National Stage Entry of International Application No. PCT/KR2012/010361, filed Dec. 3, 2012 and claims the benefit of U.S. Provisional Application Nos. 61/565,996, filed Dec. 2, 2011 and 61/577,092 filed Dec. 19, 2011, all of which are incorporated by reference in their entirety herein.

TECHNICAL FIELD

The present invention relates to a wireless access system supporting device to device communication, and more particularly, to definition of an identifier which is required for recognizing information essential for device to device communication, a transmission method thereof, and devices that support the same.

BACKGROUND ART

Hereinafter, a device to device communication environment will briefly be described.

Device to device (D2D) communication refers to communication between an electronic device and another electronic device. In a broad sense, D2D communication refers to wire or wireless communication between electronic devices or communication between a machine and a device controlled by a person. However, it is general that D2D communication recently refers to wireless communication between electronic devices performed without control of a person.

In the early 1990s when D2D communication had been introduced, D2D communication had been recognized as remote control or telematics and D2D communication markets had been very restrictive. However, D2D communication markets have received attention all over the world since D2D communication had been able to grow rapidly for last several years. Particularly, D2D communication has exerted its great influence at point of sales (POS) and security related application markets in the fields of fleet management, remote monitoring of machine and facilities, measurement of working time on construction machine facilities, and smart meter automatically measuring heat or the use of electricity. It is expected that D2D communication will be used for various purpose of uses in association with the existing mobile communication, wireless high-speed Internet, and low power communication solutions such as Wi-Fi and Zigbee and that its coverage will be extended to business to consumer (B2C) markets without limitation to business to business (B2B) markets.

In the D2D communication age, since all machines provided with a subscriber identity module (SIM) card may be able to perform data transmission and reception, they may remotely be controlled. For example, D2D communication technologies may be used for many machines and equipments such as cars, trucks, trains, containers, vending machines, and gas tanks. In this way, application ranges of D2D communication technologies are very broad.

DISCLOSURE

Technical Problem

An object of the present invention devised to solve the conventional problem is to provide an efficient communication method for D2D.

Another object of the present invention is to define an identifier (for example, RNTI: Radio Network Temporary Identification) required for D2D communication.

Still another object of the present invention is to provide a data transmission method related to D2D direct communication based on an identifier required for D2D communication.

Further still another object of the present invention is to provide a method for transmitting and receiving D2D information/signal/message between D2D devices by using D2D identifiers used for D2D communication.

Further still another object of the present invention is to provide a method for identifying transmission information/signal/message used for D2D communication.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, the present invention provides definition of an identifier which is required for recognizing information essential for device to device communication, a transmission method thereof, and devices that support the same.

In one aspect of the present invention, a method for supporting device to device (D2D) communication in a wireless access system that supports D2D communication comprises the steps of receiving, from a base station, a broadcast message which includes a common D2D identifier (C-D2D-RNTI) for all D2D devices that perform D2D communication; and receiving D2D-related information transmitted using the C-D2D-RNTI. In this case, the wireless access system may support both D2D communication and cellular communication for a general user equipment instead of the D2D device.

The method may further comprise the steps of generating a specific D2D identifier (S-D2D-RNTI) by using the C-D2D-RNTI and a user equipment specific identifier of the first D2D device; reporting the user equipment specific identifier to the base station; and receiving D2D related information transmitted using the S-D2D-RNTI.

In another aspect of the present invention, a first device to device (D2D) device for supporting D2D communication in a wireless access system that supports D2D communication comprises a radio frequency (RF) unit; and a processer for supporting the D2D communication.

In this case, the processor is configured to receive, from a base station, a broadcast message which includes a common D2D identifier (C-D2D-RNTI) for all D2D devices that perform the D2D communication, and receive D2D-related information transmitted using the C-D2D-RNTI. At this time, the wireless access system may support both D2D communication and cellular communication for a general user equipment instead of the D2D device.

In another aspect of the present invention, the processor may further be configured to generate a specific D2D identifier (S-D2D-RNTI) by using the C-D2D-RNTI and a user equipment specific identifier of the first D2D device, report the user equipment specific identifier to the base station, and receive D2D related information transmitted using the S-D2D-RNTI, through the RF unit.

In the above aspects of the present invention, the D2D related information transmitted using the C-D2D-RNTI is commonly transmitted to all the D2D devices.

Also, the D2D related information transmitted using the S-D2D-RNTI is used by a D2D link only to which the first D2D device belongs.

At this time, the first D2D device may be allocated with a cell identifier (C-RNTI) during a random access process with the base station, and may perform the cellular communication with the base station by using the C-RNTI.

At this time, the first D2D device is the device that transmits a D2D request signal for performing D2D communication, and a signal transmitted from the first D2D device to a second D2D device may include identification information indicating that the first D2D device has transmitted the signal. This identification information may be transmitted by being fixed at a specific location of the signal transmitted from the first D2D device.

The above aspects of the present invention are only a part of the embodiments of the present invention, and various embodiments based on technical features of the present invention may be devised and understood by the person with ordinary skill in the art based on the detailed description of the present invention.

Advantageous Effects

According to the embodiments of the present invention, the following advantages may be obtained.

First of all, in an environment that D2D devices coexist with a general user equipment, efficient communication may be performed between the D2D devices by using an identifier (D2D-RNTI) required for D2D communication without affecting the general user equipment.

Second, D2D information/signal/message may be transmitted and received between D2D devices by using D2D identifiers used for D2D communication.

Third, transmission information/signal/message used for D2D communication is may be identified even in an environment that multi-path delay occurs, whereby a D2D device that has transmitted information/signal/message may be prevented from misunderstanding the information/signal/message as that transmitted from the other D2D device.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

The embodiments of the present invention relate to a wireless access system that supports D2D communication, and more particularly, suggest definition of an identifier which is required for recognizing information essential for D2D communication, a transmission method thereof, and devices that support the same.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In the description of drawings, processes or steps that may make the subject matter of the present invention obscure will not be disclosed. Also, processes or steps that may be understood by the person with ordinary skill in the art will not be disclosed.

In this specification, the embodiments of the present invention have been described based on the data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. At this time, the base station (BS) may be replaced with terms such as a fixed station, Node B, eNode B (eNB), an advanced base station (ABS), and an access point (AP).

Also, in the present invention, a D2D device means a user equipment that performs communication between devices, and may simply be referred to as a device. Also, the D2D device may be replaced with terms such as a mobile station (MS), a user equipment (UE), a subscriber station (SS), a mobile subscriber station (MSS), a mobile terminal, a terminal, a device, or a machine to machine (M2M) device.

Furthermore, a transmitting end means a fixed or mobile node that transmits data services or voice services while a receiving end means a fixed or mobile node that receives data services or voice services. Accordingly, in an uplink, the mobile station could be the transmitting end while the base station could be the receiving end. Likewise, in a downlink, the mobile station could be the receiving end while the base station could be the transmitting end.

The embodiments of the present invention may be supported by standard documents disclosed in at least one of wireless access systems, i.e., IEEE 802.xx system, 3GPP system, 3GPP LTE system, and 3GPP2 system. Namely, among the embodiments of the present invention, apparent steps or parts which are not described may be supported by the above standard documents.

Also, all terminologies disclosed herein may be described by the above standard documents. Particularly, the embodiments of the present invention may be supported by one or more of the 3GPP LTE/LTE-A standard documents.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out.

The embodiments of the present invention will be described in detail with reference to the accompanying drawings to be easily carried out by the person with ordinary skill in the art to which the present invention pertains. However, it is to be understood that the present invention may be implemented by various modifications and is not limited to the embodiments which will be described herein. In the drawings, parts which are not related with the description of the present invention will be omitted to clarify the present invention. Wherever possible, the same reference numbers will be used throughout the drawings to refer to the same or like parts.

In this specification, when some part "includes/comprises" some elements, it means that the part may further include other elements unless mentioned to the contrary. Also, terminologies " . . . part," " . . . block," and " . . . module" mentioned in this specification mean a unit processing at least one function or operation, and may be implemented by hardware, software or combination of hardware and software.

Also, specific terminologies hereinafter used in the embodiments of the present invention are provided to assist understanding of the present invention, and various modifications may be made in the specific terminologies within the range that they do not depart from technical spirits of the present invention.

For example, in the embodiments of the present invention, a multicast traffic indication (MTI) field may be used to refer to a multicast paging message indication field, and a reliable traffic indication (RTI) field may be used to refer to a reliable paging message indication field. Also, the terminology 'traffic' may be used to refer to the terminology 'data'.

1. General D2D Communication

In the embodiments of the present invention, D2D communication means a communication type performed between (1) user equipments through a base station (e.g, controlled D2D) and between (2) a base station and user equipments without control of a person, or a communication type between (3) D2D devices (e.g., uncontrolled D2D). Accordingly, the D2D device means a user equipment that can support communication between the D2D devices.

An access service network for D2D service will be defined as a D2D access service network (ASN), and a network entity that performs communication with D2D devices will be referred to as a D2D server. The D2D server performs D2D application, and provides D2D specific service for one or more D2D devices. D2D feature is a feature of D2D application, and one or more features may be required to provide application. D2D device group means a group of D2D devices that share one or more features.

The number of devices (that may be referred to as various terms such as D2D device, D2D communication device, and machine type communication (MTC) device) that perform communication in a D2D mode will be increased gradually in a certain network as their device application types are increased.

Examples of device application types include (1) security, (2) public safety, (3) tracking and tracing, (4) payment, (5) healthcare, (6) remote maintenance and control, (7) metering, (8) consumer device, (9) fleet management at POS (Point Of Sales) and security related application market, (10) communication between devices of vending machines, (11) remote controlling of machine and facilities, measurement of working time on construction machine facilities, and smart meter automatically measuring heat or the use of electricity, and (12) surveillance video communication of a surveillance camera. However, the device application types are not limited to the above examples, and the other various device application types may be used.

Another feature of the D2D device is low mobility or has no mobility once the D2D device is installed. That is, low mobility or no mobility means that the D2D device is stationary for a long time. The D2D communication system may simplify or optimize mobility-associated operations for a specific D2D application having a fixed location such as secured access and surveillance, public safety, payment, remote maintenance and control, and metering.

Figure 1:
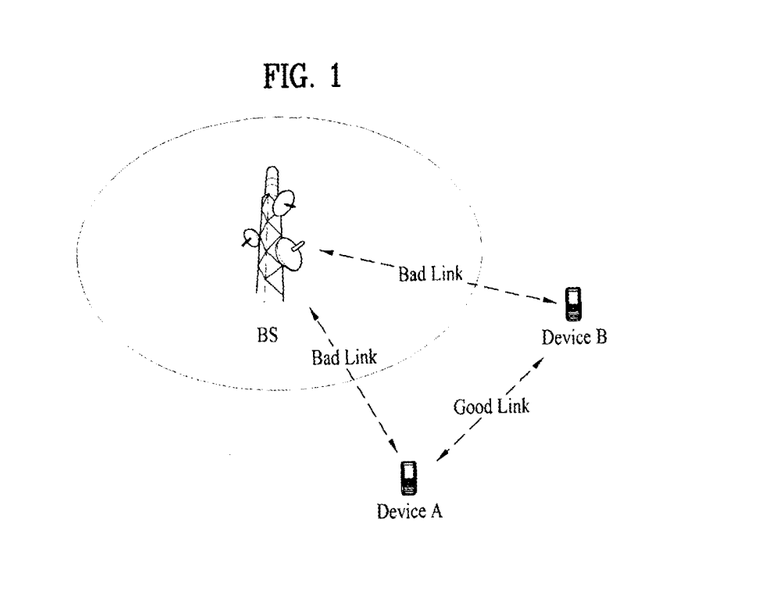
FIG. 1 is a diagram illustrating one of direct communication methods between D2D devices.

FIG. 1 is a diagram illustrating one of direct communication methods between D2D devices.

The greatest purpose of D2D direct communication is to save the power and resources as compared with communication through a base station by allowing D2D devices, which are located at a short distance from each other or have good channel statuses, to perform direct communication through a direct link. In particular, in case of D2D devices (for example, the first device and the second device) located at a short distance from the cell edge as illustrated in FIG. 1, the resource and power saving advantage due to D2D direct communication is very great.

For example, if the base station and the D2D device are respectively connected to a link (that is, controlled D2D status), since the D2D device should reserve uplink and downlink resources, in case of two D2D devices, a total of four radio resources are reserved by the D2D devices. However, in case of D2D direct communication, since a link between the D2D devices is only to be connected, two radio resources are reserved by the D2D devices. Accordingly, D2D direct communication has the greater resource and power saving advantage than that of communication through a cellular network. Also, although FIG. 1 illustrates that two D2D devices perform D2D direct communication, more than two D2D devices may perform D2D direct communication.

D2D communication in short distance communication may generally be defined as peer-to-peer (P2P) type communication. In the peer-to-peer type communication, a random access mode between communication entities is defined, wherein the communication entities mutually perform communication in accordance with a rule. And, it is not considered whether any one of the communication entities is actually connected with a public Internet network.

On the other hand, communication in a cellular network is necessarily defined as communication between a base station or its equivalent entity and a user equipment. In this case, all communication actions are controlled by the base station or its equivalent entity. In this rule, the cellular network controls all actions of the user equipment in accordance with a certain rule, thereby obtaining maximum throughput. However, this rule may excessively be controlled depending on application or channel status of the user equipment.

For example, the power to be consumed by the user equipment to transmit same data traffic may be determined by the base station, and all operations of the user equipment in transmitting same data traffic may be controlled by the base station, whereby the base station should be located at the middle even for a short distance communication. In order to enable short distance communication while consuming less power, the user equipment should use another radio access technology (RAT) or accept inconvenience of the cellular network.

This structural problem restricts use of an optimized communication path, due to a poor channel status of the user equipment, while discovering and accessing a new access path when the user equipment accesses the network. However, this problem may be solved in such a manner that the user equipment may improve power efficiency and throughput of the user equipment, which becomes a source of data traffic, by performing communication with a neighboring user equipment and performing communication with the base station if the corresponding user equipment is included in a shaded zone but has a good channel status with the neighboring user equipment.

For another example, if the user equipment desires to perform communication with its neighboring user equipment by using RAT of the cellular network only without using the cellular network and another RAT, the user equipment is controlled by the base station to transmit and receive corresponding data. However, even the user equipments physically close to each other have a very illogical communication structure that corresponding data are transmitted to the base station and then retransmitted to the targeted user equipment. This application may assume a model that a specific device serves as an aggregator in a state that a D2D server accesses each of the D2D devices through the base station if the D2D devices exist and are managed by the application.

According to another application, if an owner that manages the D2D devices is located near the corresponding devices to manage the corresponding devices, it is preferable to directly transmit data to a management device of the corresponding owner rather than transmit the data to the base station. Also, as compared with another RAT (for example, WiFi, Bluetooth, Zigbee, etc.), since the user equipment does not have to include a modem for multi-RAT, the user equipment may configure a low-priced eco-system. Also, since multi-RAT is not used, it is not required to implement processing configuration for an unnecessary application layer.

Also, an air-interface for user equipment-to-user equipment communication and user equipment-to-base station communication is designed with integrity based on single RAT, whereby inefficiency caused when the air-interface is designed independently based on multi-RAT may be resolved. In other words, if short distance communication and cellular network access are accepted using one RAT, a very efficient eco-system of the D2D devices may be configured.

This feature may equally be applied to a human type device (HTD). At this time, both short distance communication and long distance communication may be performed through a low power and low complexity device, and active quality of service (QoS) management for efficiently managing power consumption level and throughput may be performed.

However, in case of D2D direct communication for directly transmitting and receiving data between the D2D devices, another system different from the existing cellular network coexists. Accordingly, information to be used for D2D direct communication different from the cellular network is required. This information should be transmitted to all of the D2D devices that support D2D communication or some devices that use D2D communication. Accordingly, information required for D2D direct communication, a process of transmitting this information, and an identifier required for receiving the transmitted information will be required.

2. D2D Device

Figure 2:
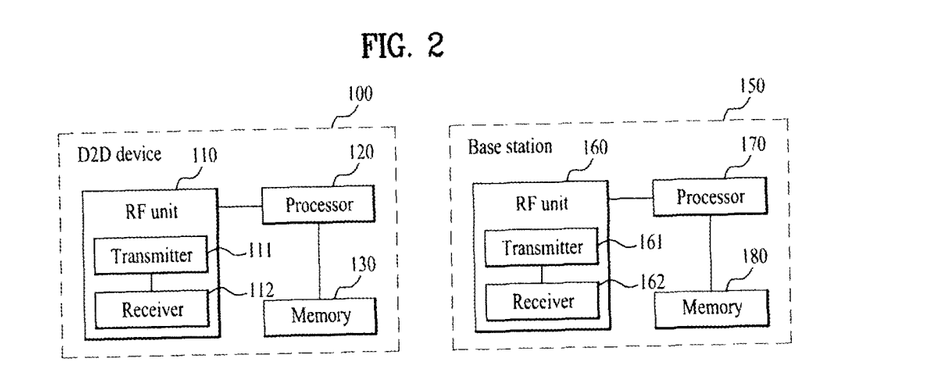
FIG. 2 is a brief diagram illustrating configurations of a D2D device and a base station in accordance with the embodiment of the present invention.

FIG. 2 is a brief diagram illustrating configurations of a D2D device and a base station in accordance with one embodiment of the present invention.

In FIG. 2, each of a D2D device 100 and a base station 150 may include a radio frequency (RF) unit 110, 160, and a processor 120, 170. Each of the D2D device and the base station may selectively include a memory 130, 180. Although FIG. 2 illustrates one D2D device and one base station, a D2D communication environment may be configured among a plurality of D2D devices and a plurality of base stations.

Each RF unit 110, 160 may include a transmitter 111, 161 and a receiver 112, 162. In case of the D2D device 100, the transmitter 111 and the receiver 112 may be configured to transmit and receive a signal to and from the base station 150 and other D2D devices, and the processor 120 may be functionally connected with the transmitter 111 and the receiver 112 to control the signal transmission and reception process of the transmitter 111 and the receiver 112 to and from other devices. Also, the processor 120 may perform various kinds of processing for a signal for transmission and then transmit the processed signal to the transmitter 111, and may perform processing for the signal received by the receiver 112.

The processor 120 may store information included in the exchanged message in the memory 130 if necessary. The D2D device 100 configured as above may perform methods of various embodiments according to the present invention which will be described later.

In the meantime, although not shown in FIG. 2, the D2D device 100 may include various additional elements in accordance with its device application type. For example, if the corresponding D2D device 100 is for smart metering, the corresponding D2D device 100 may include additional element for power measurement. An operation for power measurement may be controlled by the processor 120 shown in FIG. 2, or may be controlled by a separate processor (not shown).

Although FIG. 2 illustrates an example of communication performed between the D2D device 100 and the base station 150, a method for D2D communication according to the present invention may be performed between one or more D2D devices, each of which may perform the method according to various embodiments, which will be described later, in the same manner as each device shown in FIG. 2.

In case of the base station 150, the transmitter 161 and the receiver 162 may be configured to transmit and receive a signal to and from another base station, a D2D server and D2D devices, and the processor 170 may be functionally connected with the transmitter 161 and the receiver 162 to control the signal transmission and reception process of the transmitter 161 and the receiver 162 to and from other devices. Also, the processor 170 may perform various kinds of processing for a signal for transmission and then transmit the processed signal to the transmitter 161, and may perform processing for the signal received by the receiver 162. The processor 170 may store information included in the exchanged message in the memory 180 if necessary. The base station 150 configured as above may perform the methods of various embodiments which have been described as above.

Each processor 120, 170 of the D2D device 110 and the base station 150 commands (for example, controls, coordinates or manages) the operation of each of the D2D device 110 and the base station 150. Each processor 120, 170 may be connected with the memory 130, 180 that stores program codes and data therein. The memory 130, 180 is connected with the processor 120, 170 and stores an operating system, an application, and general files therein.

The processor 120, 170 of the present invention may be referred to as a controller, a microcontroller, a microprocessor, or a microcomputer. In the meantime, the processor 120, 170 may be implemented by hardware, firmware, software, or their combination. If the embodiments of the present invention are implemented by hardware, the processor 120, 170 may include application specific integrated circuits (ASICs), digital signal processors (DSPs), digital signal processing devices (DSPDs), programmable logic devices (PLDs), and field programmable gate arrays (FPGAs).

In the meantime, if the embodiments of the present invention are implemented by firmware or software, the firmware or software may be configured to include a module, a process, or a function, which performs functions or operations of the present invention. The firmware or software may be provided in the processor 120, 170 or may be stored in the memory 130, 180 and then may be driven by the processor 120, 170.

3. Identification Information Used for D2D Communication

Hereinafter, definition and transmission process of identification information (for example, RNTI) used for recognizing information required for D2D communication, and information received using an identifier used between D2D devices will be described in D2D direct communication for directly transmitting and receiving data between the D2D devices.

The D2D devices that perform D2D direct communication may receive information related to D2D communication on the basis of D2D identifier (D2D-RNTI) newly defined in a D2D communication environment. For example, the D2D devices that perform D2D direct communication may receive information related to D2D communication on the basis of D2D-RNTI.

In the embodiments of the present invention, D2D-RNTI is defined by common D2D RNTI (C-D2D-RNTI) used to transmit and receive information common for all the D2D devices that perform D2D direct communication and specific D2D RNTI (S-D2D-RNTI) used between specific D2D devices to transmit and receive specific information for each D2D device.

The user equipment, which supports D2D, may be identified from the user equipment, which does not support D2D, through a group (for example, index or index range) of C-RNTI (Cell RNTI) allocated from the base station. In other words, the user equipment that supports D2D may use a restricted C-RNTI value only.

4. C-D2D-RNTI and Method for Transmitting Information Using the Same

D2D devices that support or implement D2D direct communication may receive information broadcasted within a cell by using C-D2D-RNTI to transmit and receive information/signal/data used commonly in D2D direct communication. In other words, information required for D2D direct communication may be transmitted to the D2D devices on the basis of C-D2D-RNTI.

4.1 Acquisition of C-D2D-RNTI which is Broadcasted

Figure 3:
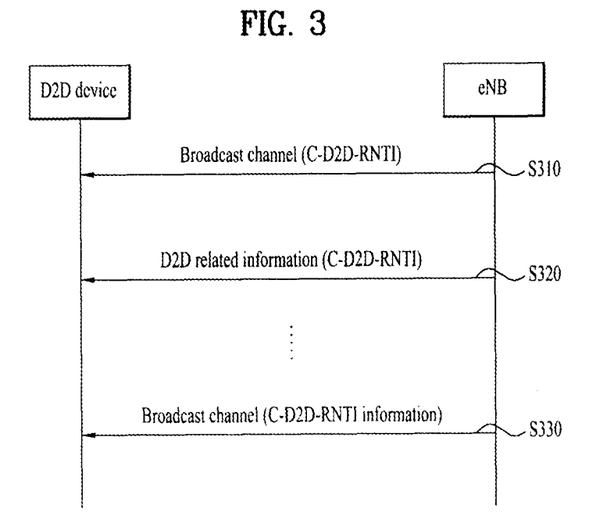
FIG. 3 is a diagram illustrating one of methods for transmitting and receiving information used for D2D direct communication by using C-D2D-RNTI in accordance with the embodiment of the present invention.

FIG. 3 is a diagram illustrating one of methods for transmitting and receiving information used for D2D direct communication by using C-D2D-RNTI in accordance with the embodiment of the present invention.

In the embodiment described with reference to FIG. 3 relates to methods for transmitting and receiving information/signal/message dedicated for a D2D device in an environment that D2D devices coexist with a general user equipment (that is, human type user equipment).

At this time, the D2D devices should receive information required for D2D direct communication to perform D2D direct communication. To this end, C-D2D-RNTI is required. However, the D2D devices that perform D2D communication initially enter a specific cell through the cellular network or perform a random access process with the base station.

Afterwards, the D2D devices that support D2D direct communication may receive C-D2D-RNTI, which is broadcasted from the base station. In other words, the base station periodically broadcasts C-D2D-RNTI through a broadcast channel (for example, physical broadcast channel (PBCH)) (S310, S330).

At this time, the D2D devices may receive D2D related information used for D2D direct communication by monitoring the broadcast channel broadcasted from the base station and receive C-D2D-RNTI. In other words, the D2D related information is transmitted using C-D2D-RNTI broadcasted from the base station. For example, the D2D related information is transmitted by being masked with C-D2D-RNTI (S320).

4.2 Acquisition of C-D2D-RNTI Based on Mode Switching

In another aspect, the D2D devices that support D2D direct communication may receive C-D2D-RNTI broadcasted from the base station after being switched from a D2D direct communication disable mode to a D2D direct communication enable mode. In other words, the D2D devices may receive the D2D related information by performing the steps described with reference to FIG. 3 during mode switching from the D2D direct communication disable mode to the D2D direct communication enable mode.

4.3 Direct C-D2D-RNTI Generation of D2D Device

Since C-D2D-RNTI is an identifier used commonly for the D2D devices, it is general that C-D2D-RNTI is maintained equally within a specific cell. Accordingly, C-D2D-RNTI may be generated on the basis of base station identification (BSID), cell ID or C-RNTI, or a function of a reference signal (RS) used by the base station for paging, without separately being broadcasted from the base station.

Accordingly, C-D2D-RNTI may be generated by the D2D devices on the basis of base station specific information (for example, BSID, CID, C-RNTI, or RS function), which may be acquired while the D2D device is entering the base station or performing a random access process, even without the separate transmission and reception process described with reference to FIG. 3.

4.4 D2D Related Information

D2D related information (see S320) transmitted on the basis of the aforementioned C-D2D-RNTI may include the following information:

(1) resource allocation information indicating a resource region (for example, peer discover channel) allocated for a peer discovery process or a reference signal for the peer discovery channel;

(2) transmission power information if a signal is transmitted to the peer discovery channel;

(3) information related to location of polling resource, timing, and type/transmission method (for example, modulation and coding scheme (MCS) level, bit size, etc.) of information to be transmitted;

(4) D2D specific preamble or index of preamble which may be allocated to the D2D device (however, which may also be allocated to a general user equipment);

(5) information related to type/transmission method (e.g. MCS level, bit size, etc.) of information to be transmitted to the base station during transmission of a D2D request signal requesting D2D communication after peer discovery;

(6) information related to the maximum number of neighboring D2D devices (neighboring user equipments) to be reported to the base station or related to an interference level (for example, received power at a peer discover channel) of neighboring D2D devices which become references to be reported during D2D request after peer discover;

(7) information related to maximum transmission power during D2D request after peer discovery or during initial data transmission after resource acquisition through D2D request;

(8) location of a resource region where S-D2D-RNTI may be received, or function for calculating S-D2D-RNTI using cell specific information and user equipment specific information or parameter required for calculation; and (9) parameter (for example, offset, etc.) used during selection of D2D direct communication and communication mode of the cellular network.

5. S-D2D-RNTI and Method for Transmitting Information Using the Same

In case of D2D direct communication, since a link should be configured between D2D devices, it is required to transmit information, which is not defined in the existing cellular link, between the D2D devices through a D2D link. Also, in order to prevent other D2D devices, which are not included in the D2D link, from listening to information of the corresponding D2D link during a communication process between the corresponding D2D devices, information should only be transmitted between the D2D devices of a specific D2D link. To this end, S-D2D-RNTI is required.

S-D2D-RNTI may be used instead of C-RNTI received from the base station if the D2D device performs a cell entrance (for example, network (re)entry process, etc.) process or a random access process. C-RNTI is identification information used for the cellular network, and is a cell identifier allocated from the base station to the user equipment during the random access process or after the random access process ends.

5.1 Method for Generating S-D2D-RNTI Using C-D2D-RNTI

D2D devices, which support or perform D2D direct communication, may transmit and receive information required for data transmission between the D2D devices of D2D direct communication on the basis of S-D2D-RNTI. In other words, information required for data transmission between the D2D devices may be transmitted and received between the D2D devices on the basis of specific D2D RNTI between the devices.

Figure 4:
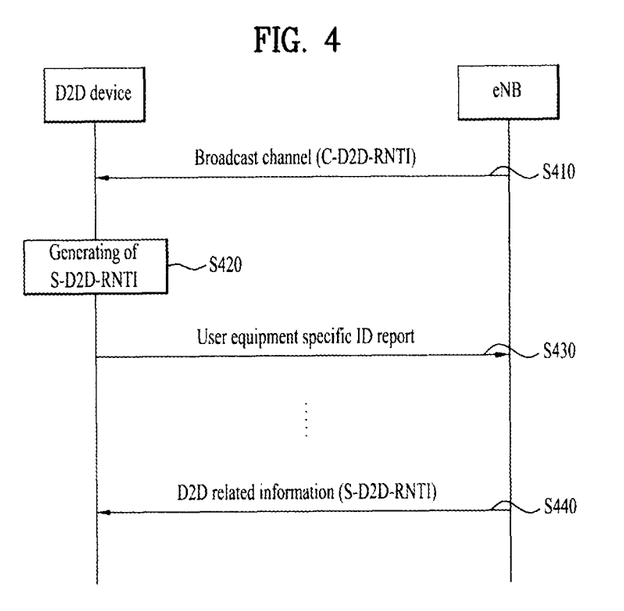
FIG. 4 is a diagram illustrating a method for generating S-D2D-RNTI by using C-D2D-RNTI in accordance with the embodiment of the present invention.

FIG. 4 is a diagram illustrating a method for generating S-D2D-RNTI by using C-D2D-RNTI in accordance with the embodiment of the present invention.

Referring to FIG. 4, the base station (eNB) may periodically broadcast C-D2D-RNTI (or cell ID) to the D2D devices through the broadcast channel (S410).

The D2D device may generate S-D2D-RNTI by using functions of the received C-D2D-RNTI and user equipment specific identifier (for example, medium access control (MAC)) address of the D2D device, mobile station ID, and international mobile subscriber identifier (IMSI)) (S420).

At this time, the D2D device should report user equipment specific identifier used to generate S-D2D-RNTI to the base station (S430).

The base station may generate S-D2D-RNTI by using the received user equipment specific identifier. Afterwards, the base station may transmit D2D related information used for the specific D2D link to the D2D devices included in the specific D2D link by using S-D2D-RNTI (S440).

5.2 Method for Generating S-D2D-RNTI Using C-RNTI

The D2D device may generate S-D2D-RNTI by using C-RNTI or its function received through a second message (for example, random access response message) received during the random access process with the base station.

C-RNTI received through the second message of the random access process should be taken back after a third message. However, if D2D direct communication is performed, S-D2D-RNTI may be generated by reuse of C-RNTI.

5.3 S-D2D-RNTI Related Information

S-D2D-RNTI may be generated using the aforementioned methods. Afterwards, D2D related information transmitted using S-D2D-RNTI at step S440 may be as follows:

(1) grant of D2D link;

(2) control information (for example, ACK/NACK, RI (Rank Indicator), channel quality information (CQI), etc.) of D2D link;

(3) resource allocation information indicating a resource region allocated to the D2D device for D2D direct communication; and (4) D2D request signal and D2D response signal which is a response signal to the D2D request signal.

6. Cellular Communication Method of D2D Device which is Performing D2D Direct Communication The D2D device which is performing D2D direct communication may perform communication with the base station. In this case, a case where the D2D device should simultaneously have identifiers defined for D2D direct communication and an identifier for communication (that is, cellular communication) with the base station may occur.

Figure 5:
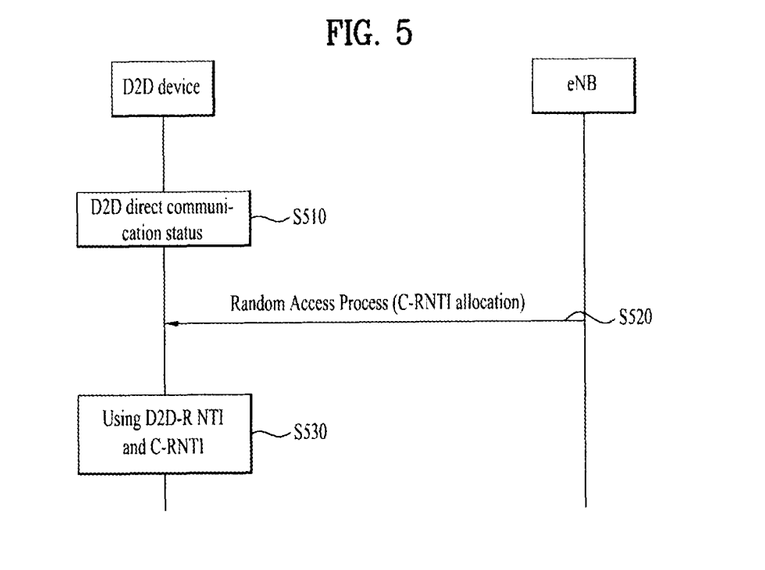
FIG. 5 is a diagram illustrating a method for performing cellular communication between a D2D device, which is performing D2D direct communication, and a base station.

FIG. 5 is a diagram illustrating a method for performing cellular communication between a D2D device, which is performing D2D direct communication, and a base station.

If the D2D device which is performing D2D direct communication performs communication (cellular communication) to the cellular network, the D2D device may simultaneously have RNTI (for example, C-D2D-RNTI, S-D2D-RNTI) for performing D2D direct communication and RNTI (for example, C-RNTI) for performing communication with the base station. Hereinafter, a method for enabling the D2D device to acquire RNTI for performing cellular communication will be described.

It is assumed that the D2D device is performing D2D direct communication (S510).

Afterwards, RNTI (for example, C-RNTI) newly allocated to the D2D device, which is performing D2D direct communication, for communication with the cellular network may be allocated through the random access process with the base station (S520).

In other words, the D2D device, which is performing D2D direct communication, should newly perform the random access process with the base station to perform cellular communication. As a result, C-RNTI may be allocated to the D2D device.

However, the random access process performed at the step S520 may be not a contention based random access process but a non-contention based random access process dedicated for a specific D2D device. If the D2D device performs the non-contention based random access process, C-RNTI may be allocated to the D2D device more quickly than the contention based random access process.

Referring to FIG. 5 again, the D2D device may perform D2D direct communication and/or cellular communication by using D2D-RNTI and C-RNTI (S530).

If the D2D device transmits a D2D request signal for performing D2D direct communication through the base station in a type of the random access process and S-D2D-RNTI belongs to a signal set different (or independent) from that of C-RNTI allocated during the random access process and uses a signal different from that of C-RNTI, the D2D device may continue to have C-RNTI received during the process of the D2D request without taking it back, and may use it as C-RNTI for performing communication with the base station until D2D direct communication ends.

7. Method for Using S-D2D-RNTI

Since the D2D devices perform D2D direct communication by using given resources, the same S-D2D-RNTI may be used for information/signal/messages transmitted and received between the D2D devices.

However, in a path of which transmission delay is great, among multi-path, a signal transmitted from a first D2D device may be received through its antenna at a reception timing of the first D2D device. Accordingly, it may be required to identify what D2D device has transmitted specific information/signal/message and identify signals for transmission and reception.

Accordingly, the D2D devices, which perform D2D direct communication, may be operated as follows.

In order to prevent the signal transmitted from the D2D device from being misunderstood as the signal transmitted from the other D2D device due to multi-path delay in a state of D2D direct communication, the corresponding D2D device may use transmitted information/signal/messages as identification information of 1 bit or multiple bits for identifying the transmission D2D device at a fixed location (for example, the most significant bit (MSB) or the least significant bit (LSB). In other words, identification information indicating the transmission D2D device or transmitted information/signal/messages may be displayed in the fixed location of the transmitted data.

7.1 Method for Identifying D2D Through Base Station

Figure 6:
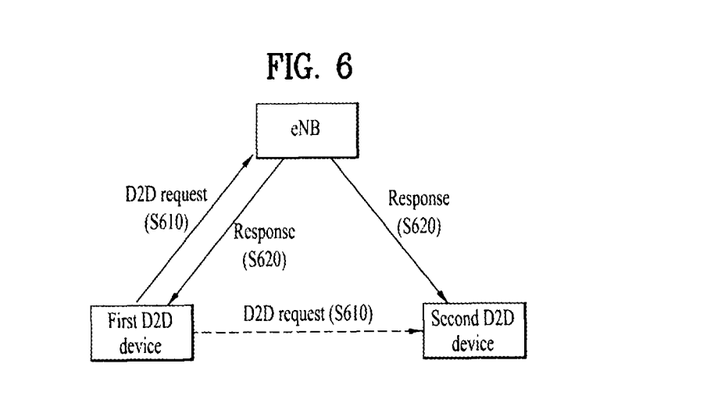
FIG. 6 is a diagram illustrating one of methods for identifying a D2D device, which transmits information/signal/message, in accordance with the embodiment of the present invention.

FIG. 6 is a diagram illustrating one of methods for identifying a D2D device, which transmits information/signal/message, in accordance with the embodiment of the present invention.

Identification of the D2D devices may be determined in case of D2D request. Referring to FIG. 6, if the first D2D device performs D2D request through the base station (S610), identification of the first D2D device and the second D2D device may be determined by the base station. For convenience of description, in FIG. 6, it is assumed that the first D2D device performs D2D request and the second D2D device receives D2D request.

The base station may set identification of the first D2D device, which has transmitted D2D request, to 1 or 11, and may set identification of the second D2D device, which has received D2D request, to 0 or 00. Afterwards, the base station may transmit a response message, which includes identification information on the D2D devices to the D2D devices (S620).

7.2 Method for Identifying D2D Between D2D Devices-1

In another aspect of this embodiment, identification of the D2D devices may be determined from the relation between the first D2D device, which has transmitted a D2D request signal, and the second D2D device, which has received the D2D request signal. For example, the first D2D device, which has performed D2D request, may use 1 or 11 as identification of the information/signal/message used for D2D direct communication, and the second D2D device may use 0 or 00 as identification the message used for the corresponding D2D link.

Referring to FIG. 6, the first D2D device may directly perform the D2D request for the second D2D device not the base station. In this case, the first D2D device may set the information/signal/message transmitted during the D2D communication process with the second D2D device to 1 or 11 and then transmit the set information/signal/message.

Accordingly, even though the first D2D device receives the information/signal/message transmitted from itself due to multi-path delay, if identification information included in the corresponding information/signal/message indicates 1 or 11, the first D2D device may recognize that the received information/signal/message is transmitted from itself, and may disregard the information/signal/message.

However, in this case, identification of the information/signal/message may be determined regardless of the scheme that directly performs D2D request between the D2D devices and the scheme that performs D2D request through the base station.

7.3 Method for Identifying D2D Between D2D Devices-2

The first D2D device, which has transmitted a D2D request signal, may randomly determine identification of information/signal/message. For example, the first D2D device, which has transmitted the D2D request signal, may select 1 or 11 as identification of the corresponding information/signal/message, and the second D2D device, which has received the D2D request, may use 0 or 00 as identification the information/signal/message.

In this case, identification of the information/signal/message may be determined regardless of the scheme that directly performs D2D request between the user equipments and the scheme that performs D2D request through the base station.

7.4 Method for Identifying D2D Between D2D Devices-3

In case of 7.1, the D2D request to the base station may be performed in a type of the random access process. In this case, a third message (message 3) of the random access process, that is, identification information on transmitted information/signal/message may be transmitted in response to the base station.

7.5 Method for Identifying D2D Between D2D Devices-4

In case of 7.2, if the D2D request is performed through the base station in a type of the random access process, the first D2D device may transmit identification information on transmitted information/signal/message to the base station through a third message (message 3).

At this time, the base station may select identification information on the first D2D device, which transmits the D2D request, on the basis of the received identification information, and may notify the second D2D device, which receives the D2D request, of the selected identification information.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The embodiments of the present invention may be applied to various wireless access systems. Examples of the various wireless access systems include 3GPP (3rd Generation Partnership Project) system, 3GPP2 system and/or IEEE 802.xx (Institute of Electrical and Electronic Engineers 802) system. The embodiments of the present invention may be applied to all the technical fields based on the various wireless access systems as well as the various wireless access systems.

The invention claimed is:

1. A method for supporting device to device (D2D) communication in a wireless access system that supports D2D communication, the method performed by a first D2D device and comprising:
   receiving, from the base station, a broadcast message including a common D2D identifier (C-D2D-RNTI);
   reporting, a user equipment specific identifier of the first D2D device after receiving the broadcast message; and
   receiving, from the base station, first D2D related information using the C-D2D-RNTI, and second D2D related information using a specific D2D identifier (S-D2D-RNTI), respectively;
   wherein the first D2D related information is transmitted using the C-D2D-RNTI to all D2D devices that support D2D direct communication or perform D2D direct communication,
   wherein the second D2D related information is only transmitted using the S-D2D-RNTI to the first D2D device and paired D2D device which performs D2D direct communication with the first D2D device,
   wherein the first D2D related information comprises resource allocation information indicating a resource region allocated for a peer discovery process and information on function/parameter for calculating the S-D2D-RNTI using the C-D2D-RNTI and the user equipment specific identifier of the first D2D device,
   wherein the second D2D related information comprises D2D link information comprising control information of the D2D link or resource allocation information indicating a resource region allocated to the first D2D device for D2D direct communication,
   wherein the S-D2D-RNTI is generated using the C-D2D-RNTI and the user equipment specific identifier of the first D2D device using the function/parameter indicated by the first D2D related information.

2. The method according to claim 1, wherein the first D2D device is allocated with a cell identifier (C-RNTI) during a random access process with the base station, and performs the cellular communication with the base station by using the C-RNTI.

3. The method according to claim 1, wherein the first D2D device and the paired D2D device performing D2D direct communication with the first D2D device are using an identical S-D2D-RNTI for transmitting or receiving signals between each other.

4. The method according to claim 3, wherein a signal transmitted from the first D2D device to the paired D2D device includes first identification information identifying the first D2D device among D2D devices using the identical S-D2D-RNTI.

5. The method according to claim 4, wherein the first identification information is transmitted by being fixed at a specific location of the signal transmitted from the first D2D device.

6. The method according to claim 1,
   wherein the second D2D related information further comprises information regarding grant of the D2D link between the first D2D device and the paired D2D device.

7. A first device to device (D2D) device for supporting D2D communication in a wireless access system that supports D2D communication, the first D2D device comprising:
   a radio frequency (RF) unit; and
   a processor for supporting the D2D communication,
   wherein the processor:
   receives, from the base station, a broadcast message including a common D2D identifier (C-D2D-RNTI),
   reports, a user equipment specific identifier of the first D2D device after receiving the broadcast message, and
   receives, from the base station, first D2D related information using the C-D2D-RNTI, and second D2D related information using a specific D2D identifier (S-D2D-RNTI), respectively, through the RF unit,
   wherein the first D2D related information is transmitted using the C-D2D-RNTI to all D2D devices that support D2D direct communication or perform D2D direct communication,
   wherein the second D2D related information is only transmitted using the S-D2D-RNTI to the first D2D device and paired D2D device which performs D2D direct communication with the first D2D device,
   wherein the first D2D related information comprises resource allocation information indicating a resource region allocated for a peer discovery process and information on function/parameter for calculating the S-D2D-RNTI using the C-D2D-RNTI and the user equipment specific identifier of the first D2D device
   wherein the second D2D related information comprises D2D link information comprising control information of the D2D link or resource allocation information indicating a resource region allocated to the first D2D device for D2D direct communication
   wherein the S-D2D-RNTI is generated using the C-D2D-RNTI and the user equipment specific identifier of the first D2D device using the function/parameter indicated by the first D2D related information.

8. The first D2D device according to claim 7, wherein the first D2D device is allocated with a cell identifier (C-RNTI)

during a random access process with the base station, and performs the cellular communication with the base station by using the C-RNTI.

9. The first device according to claim 7, wherein the first D2D device and the paired D2D device performing D2D direct communication with the first D2D device are using an identical S-D2D-RNTI for transmitting or receiving signals between each other.

10. The first D2D device according to claim 9, wherein a signal transmitted from the first D2D device to the paired D2D device includes first identification information identifying the first D2D device among D2D devices using the identical S-D2D-RNTI.

11. The first D2D device according to claim 10, wherein the first identification information is transmitted by being fixed at a specific location of the signal transmitted from the first D2D device.

12. The first D2D device according to claim 7,
wherein the second D2D related information further comprises information regarding grant of the D2D link between the first D2D device and the paired D2D device.

* * * * *